(12) United States Patent
Son et al.

(10) Patent No.: US 8,591,609 B2
(45) Date of Patent: Nov. 26, 2013

(54) REFORMER WITH HIGH DURABILITY

(75) Inventors: In-Hyuk Son, Suwon-si (KR);
Woo-Cheol Shin, Suwon-si (KR);
Jong-Rock Choi, Suwon-si (KR);
Jin-Goo Ahn, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 789 days.

(21) Appl. No.: 12/761,598

(22) Filed: Apr. 16, 2010

(65) Prior Publication Data

US 2011/0158866 A1 Jun. 30, 2011

Related U.S. Application Data

(60) Provisional application No. 61/290,144, filed on Dec. 24, 2009.

(51) Int. Cl.
*B01J 8/00* (2006.01)

(52) U.S. Cl.
USPC .......................................... 48/127.9

(58) Field of Classification Search
USPC ................... 422/129–242; 429/400–535
See application file for complete search history.

(56) References Cited

U.S. PATENT DOCUMENTS

| | | | |
|---|---|---|---|
| 4,740,357 A * | 4/1988 | Buswell et al. ............... | 422/625 |
| 2003/0054209 A1 * | 3/2003 | Gillett et al. .................... | 429/13 |
| 2003/0192251 A1 | 10/2003 | Edlund et al. | |
| 2004/0068933 A1 | 4/2004 | Nakamura et al. | |
| 2007/0104625 A1 | 5/2007 | Su | |
| 2009/0258263 A1 | 10/2009 | Fujioka et al. | |
| 2010/0040519 A1 * | 2/2010 | Higashino et al. ............ | 422/198 |

FOREIGN PATENT DOCUMENTS

| | | |
|---|---|---|
| CN | 1701038 A | 11/2005 |
| EP | 1 094 031 A1 | 4/2001 |
| JP | 05-303972 | 11/1993 |
| JP | 3069743 B2 | 5/2000 |
| JP | 2001-342002 | 12/2001 |
| JP | 2003-063803 | 3/2003 |
| JP | 2004-35328 A | 2/2004 |
| JP | 2004-256348 A | 9/2004 |
| JP | 2004-288434 A | 10/2004 |
| JP | 2006-286279 | 10/2006 |

(Continued)

OTHER PUBLICATIONS

Machine translation of JP 2007-320812 A.*

(Continued)

*Primary Examiner* — Imran Akram
(74) *Attorney, Agent, or Firm* — Christie, Parker & Hale, LLP

(57) ABSTRACT

A reformer including a heating unit, a first combustor for receiving and oxidizing a heating unit fuel at a first end of the heating unit, and a second combustor for receiving and oxidizing an anode off gas at a second end of the heating unit, a reforming unit having a first reforming portion surrounding the heating unit, a second reforming portion surrounding the first reforming portion, and a flow path portion connecting the first reforming portion and the second reforming portion to provide fluid communication therebetween, and a heat resistant shield between the flow path portion and the second combustor. Here, the heat resistant shield protects the reforming unit from being distorted by thermal expansion caused by the heating unit. In addition, the flow path portion may be formed with a blade configured to further protect the connector from being distorted by thermal expansion.

19 Claims, 6 Drawing Sheets

(56) References Cited

FOREIGN PATENT DOCUMENTS

| | | |
|---|---|---|
| JP | 2007-311165 | 11/2007 |
| JP | 2007-320812 A | 12/2007 |
| JP | 2009-209003 | 9/2009 |
| WO | WO 02/00548 A1 | 1/2002 |
| WO | WO 03/078311 A1 | 9/2003 |

OTHER PUBLICATIONS

Machine translation of JP 2004-288434 A.*
Extended European Search Report dated May 4, 2011 in corresponding European patent application No. 10251028.6, 5 shts.
KIPO Office Action for corresponding Korean patent application No. 10-2010-0040506, dated Oct. 7, 2011, 6 pages.
JPO Office Action dated Oct. 9, 2012 for JP 2010-190508 (3 pages).
Patent Abstracts of Japan Publication No. 04-149003 dated May 22, 1992 corresponding with JP 3069743 B2 dated May 26, 2000 (1 page).
SIPO first Office action, dated Jan. 28, 2013, for Chinese Application No. 201010516334.6, with English translation, 18 pages.
KIPO Office action dated Dec. 28, 2012, for corresponding Korean Patent application 10-2010-0040506, (1 page).

* cited by examiner

REFORMER WITH HIGH DURABILITY

CROSS-REFERENCE TO RELATED APPLICATION

This application claims priority to and the benefit of U.S. Provisional Application No. 61/290,144, filed on Dec. 24, 2009, in the United States Patent and Trademark Office, the disclosure of which is incorporated herein in its entirety by reference.

BACKGROUND

1. Field

An embodiment of the present invention relates to a reformer with high durability.

2. Description of Related Art

In recent years due to concern about environmental pollution, various alternative and less polluting energy sources, such as fuel cells with relatively high energy efficiency have been developed.

A fuel cell is a device (or a type of energy source) that directly converts chemical energy into electric energy through electrochemical reaction of hydrogen and oxygen. A fuel cell is classified as a polyelectrolyte fuel cell, a solid oxide fuel cell, or a molten carbonate fuel cell depending on the type of its electrolyte. Hydrogen used in the polyelectrolyte fuel cell is typically acquired from reformate that has been reformed from hydrocarbon fuel such as methanol, liquid petroleum gas (LPG), gasoline, etc. This reforming process is necessary because of the difficulties in storing and transporting pure hydrogen. The reformate may be a steam-type reformate resulting from a steam reform reaction of the hydrocarbon fuel. Here, in most fuel cell systems using the steam reform type reformate, a heating unit is required to supply heat for the steam reform reaction.

In the reforming process, after electrons are generated from a stack, reformate and other remaining materials are discharged from an anode of the stack, and this discharge is referred to as anode off gas (AOG). In the related art, the AOG is combusted by using an additional catalytic combustor and/or mixed with atmospheric gas to decrease the concentration of other discharge gases such as $H_2$, CO, and $CH_4$ in the AOG.

However, as worldwide environmental standards grow, there is a desire and need to more positively manage the AOG in the manufacturing of a fuel cell that may be used in an indoor environment. Also, considering that one of the main components of the AOG gas is hydrogen ($H_2$), and to satisfy environmental concerns of atmospheric pollution, there is an urgent desire or need to technologically develop a method for combusting the AOG gas that allows for both processing of the AOG and for improving the efficiency of the reformer.

To this end, an embodiment of the present invention provides a reformer that oxidizes or combusts the AOG by returning the AOG to a heating unit of the reformer to improve thermal efficiency and to satisfy certain environmental concerns. However, due to oxidation of the reformate, oxidation of the heating unit fuel, and/or oxidation of the AOG, the reformer has characteristic high-temperature atmosphere, that generates a plurality of hot spots. As such, there is a need to develop a design that can alleviate or distribute these hot spots. That is, in order to allow the reformer to operate for a long time without deterioration or damage, as described above, thermal shock caused by repetition of thermal expansion and shrinkage should be reduced or minimized through the alleviation or distribution of the hot spots to thereby reduce or minimize the deterioration and damage caused due to thermal stresses on the reformer.

However, because the heating unit operates at a high-temperature atmosphere, it may be difficult for a method to distribute and alleviate the hot spots to be satisfactory for the management of the lifespan of the reformer. As such, a more positive protection structure is needed and desired.

SUMMARY

An aspect of an embodiment of the present invention is directed toward a reformer having a structure capable of reducing its damage caused by thermal transformation by utilizing a heat-resistant shield in a portion of the reformer where anode discharge gas is introduced and thermal transformation (or distortion) is generated.

An aspect of an embodiment of the present invention is directed toward a reformer for a fuel cell that has a structure capable of protecting its reforming unit from being distorted by thermal expansion.

Embodiments of the present invention provide mechanisms for reducing or preventing an increase in the pressure of a combustor due to deterioration by appropriately distributing points where hot spots are generated. These appropriately distributed points are points of introduction and/or oxidation of the anode discharge gas into a heating unit of a reformer.

Embodiments of the present invention provide mechanisms for reducing or minimizing thermal transformation (or distortion) around a combustor of a reformer, which is caused by a high-temperature atmosphere.

Embodiments of the present invention provide mechanisms for increasing the efficiency of a reformer by increasing combustion efficiency of discharge gas.

In particular, an embodiment of the present invention provides a thermally durable reformer. The reformer includes a heating unit, a first combustor configured to receive and oxidize a heating unit fuel at a first end of the heating unit, and a second combustor configured to receive and oxidize an anode off gas at a second end of the heating unit, a reforming unit having a first reforming portion surrounding the heating unit, a second reforming portion surrounding the first reforming portion, and a flow path portion outside the second reforming portion and connecting the first reforming portion and the second reforming portion to provide fluid communication therebetween, and a heat resistant shield between the flow path portion and the second combustor. Here, the heat resistant shield protects the reforming unit (specifically the flow path portion) from being distorted by thermal expansion caused by the heating unit (e.g., by the heat generated at the second combustor).

In one embodiment, the second combustor includes a nozzle configured to expel the anode off gas into the heating unit and the heat resistant shield overlaps at least a portion of the nozzle.

In one embodiment, the heat resistant shield contacts a surface of an innermost wall of the flow path portion facing the second combustor.

In one embodiment, the heat resistant shield is fixed to a peripheral surface of an innermost wall of the flow path portion facing the second combustor by a spot weld.

In one embodiment, the flowing path further includes a blade configured to protect the flow path portion from being distorted by thermal expansion. Here, the blade is configured to further protect the flow path portion from being distorted by thermal expansion and/or to improve the distribution of fluid flowing in the flow path portion.

In one embodiment, the blade is on an extension line extending along a diameter direction with respect to the central axis of the heating unit in the flow path portion and fixed to a surface of an innermost wall of the flow path portion facing away from the second combustor and a bottom plate of the flow path portion.

In one embodiment, the second combustor includes a nozzle configured to expel the anode off gas in direction perpendicular to the central axis of the heating unit.

In one embodiment, the first reforming portion has a first space configured to perform a steam reform reaction.

In one embodiment, the second reforming portion has a second space configured to perform a water gas shift (WGS) reaction.

In one embodiment, the flow path portion is outside of at least one of the second reforming portion or the first reforming portion.

In one embodiment, the flow path portion is outside of both the second reforming portion and the first reforming portion.

An embodiment of the present invention provides a reformer including: a heating unit; a first combustor configured to receive and oxidize a heating unit fuel at a first end of the heating unit; a second combustor configured to receive and oxidize an anode off gas (AOG) at a second end of the heating unit; and a reforming unit including a first reforming portion surrounding the heating unit, a second reforming portion surrounding the first reforming portion, and a flow path portion connecting the first reforming portion and the second reforming portion to be in fluid communication with each other. Here, the flow path portion includes a blade configured to protect the flow path portion from being distorted by thermal expansion and/or to improve the distribution of fluid flowing in the flow path portion.

In one embodiment, the blade is on an extension line extending along a diameter direction with respect to the central axis of the heating unit in the flow path portion and fixed to a surface of an innermost wall of the flow path portion facing away from the second combustor and a bottom plate of the flow path portion.

In one embodiment, the second combustor includes a nozzle configured to expel the anode off gas in direction perpendicular to the central axis of the heating unit.

In one embodiment, the first reforming portion has a first space configured to perform a steam reform reaction.

In one embodiment, the second reforming portion has a second space configured to perform a water gas shift (WGS) reaction.

In one embodiment, the flow path portion is outside of at least one the second reforming portion or the first reforming portion.

In one embodiment, the flow path portion is outside of both the second reforming portion and the first reforming portion.

Here, the reformer according to an embodiment of the present invention can prevent or block the pressure of a combustor from being increased due to deterioration by appropriately distributing points where hot spots are generated at portions of the reformer where anode discharge gas is introduced into a heating unit of the reformer and oxidized.

Further, an embodiment of the present invention can prevent or block neighboring components of a combustor from being distorted due to a difference in thermal expansion rate by forming a shield between a flow path portion and the combustor.

In addition, an embodiment of the present invention can protect from thermal distortion (transformation) and/or improve thermal conductivity for a catalyst and/or improve the distribution of fluid flowing in a flow path portion by increasing (subsidizing) the rigidity of an innermost side wall of the flow path portion through a blade.

In addition, an embodiment of the present invention can increase the efficiency of a reformer by increasing combustion efficiency of discharge gas.

Consequently and according to embodiments of the present invention, by improving the efficiency and reliability of a reformer, it is possible to operate the reformer in an environmental-friendly manner and improve the lifespan of the reformer.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION

Figure 1:
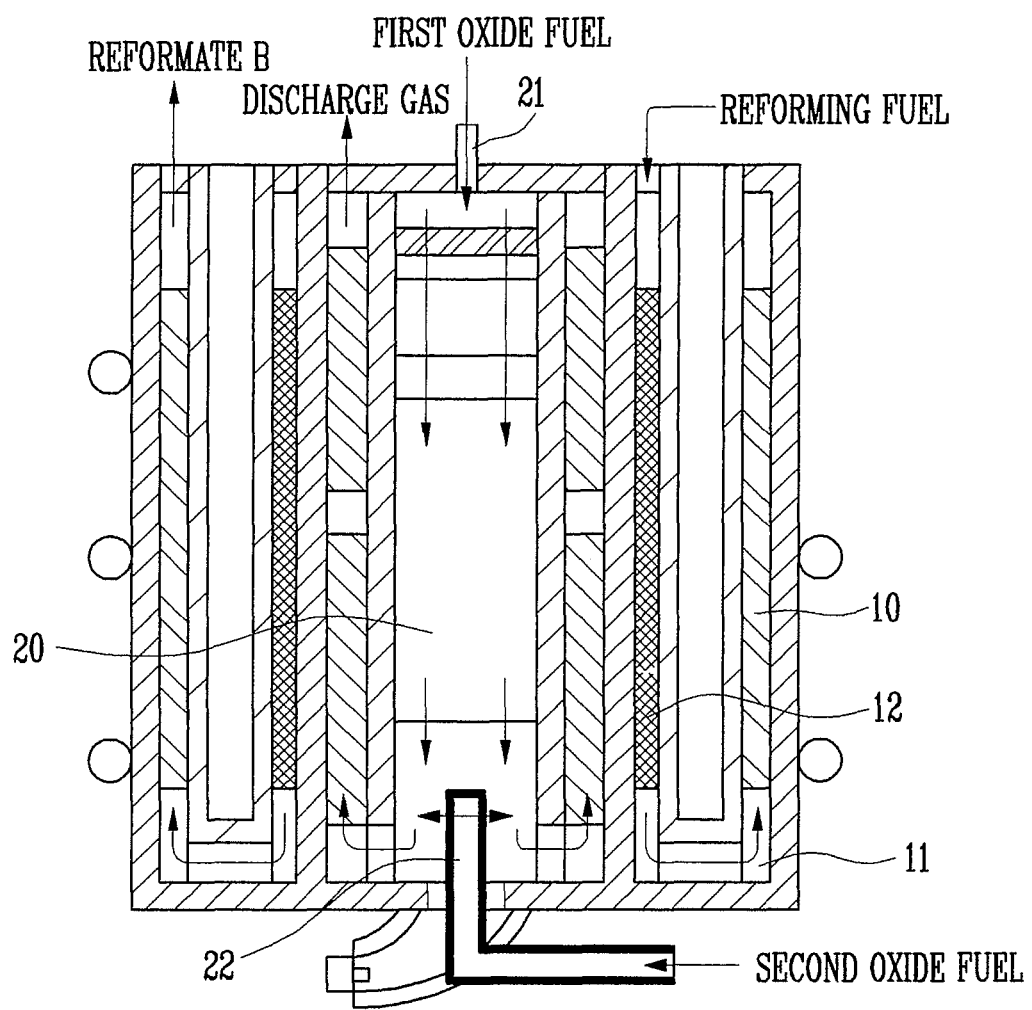
FIG. 1 is a longitudinal cross-sectional view schematically showing a configuration of a reformer pursuant to an embodiment of the present invention.

Hereinafter, an embodiment of the present invention will be described with reference to the accompanying drawings. Terms representing directions such as 'up, down, left, and right' used in the embodiment of the present invention are based on states displayed in the drawings if particularly defined or referred.

FIG. 1 schematically shows a reformer pursuant to an embodiment of the present invention. Referring to FIG. 1, the reformer includes a heating unit 20; a reforming unit composed of a first reforming portion 12, a second forming portion 10, and a flow path portion (or connector) 11 connecting the first reforming portion 12 and the second forming portion 10 to be in fluid communication; a first combustor 21; and a second combustor 22. Hereinafter, the above described components of the reformer will be described in more detail.

Figure 2:
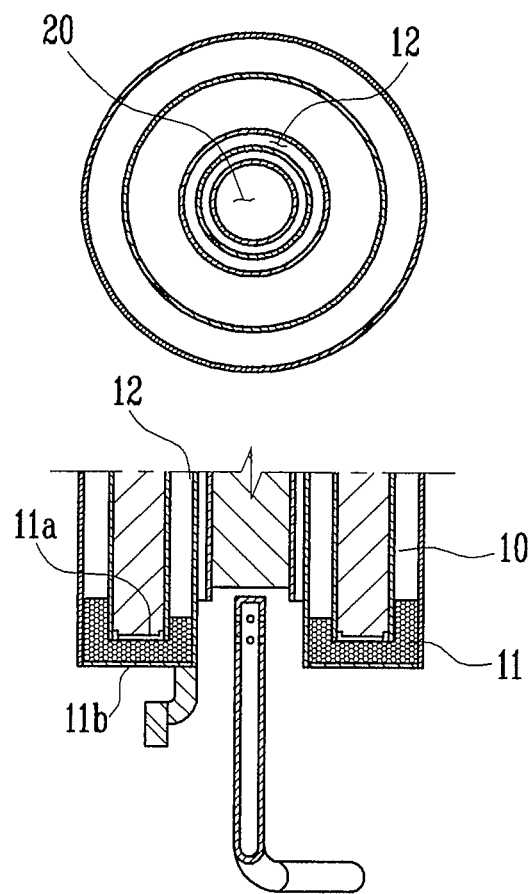
FIG. 2 is a transverse cross-sectional view schematically showing a configuration of a reformer pursuant to an embodiment of the present invention.

As shown in FIG. 1, the reformer has the heating unit 20 at the center thereof and extending along the central axis (the longitudinal central axis) of the reformer. The heating unit 20 has a hollow cylindrical shape or polygonal shape. As shown in FIG. 2, a first reforming portion 12 surrounding the heating unit 20 is provided on the outside of the heating unit 20 and a second reforming portion 10 surrounding the first reforming portion 12 is provided on the outside of the first reforming portion 12. Further, the first reforming portion 12 and the second reforming portion 10 are connected with each other by the flow path portion (or connector) 11 on the bottoms thereof to be in fluid communication. Here, the flow path portion 11 is outside of the second reforming portion 10 and/or the first reforming portion 12. The flow path portion 11 is constituted by a top plate 11a and a bottom plate 11b. The flow path portion 11 is welded onto bottom portions of the first reforming portion 12 and the second reforming portion 10 to seal them.

A thermal structure according to an embodiment of the present invention, is provided, that has its highest temperature at the center (the central axis) of the reformer, and the temperature decreases in an outward direction from the central axis of the reformer, thereby maintaining a uniform oxidation temperature.

In addition, the first combustor 21 and the second combustor 22 that respectively receive and oxidize heating unit fuel and anode off gas (AOG) are provided at first and second ends of the heating unit 20. Here, the heating unit fuel is or includes a primary fuel such as liquid petroleum gas (LPG), etc. supplied to maintain the temperature of the heating unit 20. The AOG is an uncombusted gas containing hydrogen discharged from an anode as a primary component after electricity is generated through an oxidation reaction in an electricity generator (e.g., composed of one or more fuel cells, etc.). In one embodiment, the first combustor 21 supplying and oxidizing the heating unit fuel is provided at or on the first end (e.g., the top or top end) of the heating unit 20 and the second combustor 22 resupplying and oxidizing the AOG is provided at or on the second end (e.g., the bottom or bottom end) of the heating unit 20.

Figure 6:
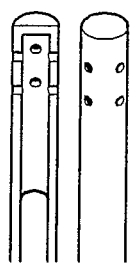
FIG. 6 is a perspective view and a longitudinal cross-sectional view showing a second combustor having four nozzles per one line, which are horizontally arranged in total two lines according to an embodiment of the present invention.
Figure 7:
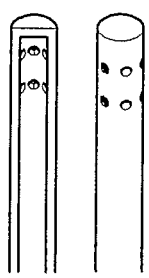
FIG. 7 is a perspective view and a longitudinal cross-sectional view showing a second combustor having six nozzles per one line, which are horizontally arranged in a total of two lines according to an embodiment of the present invention.

The second combustor 22 has a nozzle to expel the AOG in a direction perpendicular to the central axis of the heating unit 20 as shown in FIGS. 6 and 7. That is, with respect to the nozzle of the second combustor 22, a plurality of nozzles is formed in a transverse direction to increase or maximize a mixing effect of the AOG and reduce any hot spot concentrated at or in the vicinity of the first oxide catalyst layer as shown in FIG. 6.

A basic reaction of the reformer is as follows. That is, when the heating unit fuel such as LPG, etc. is supplied to the heating unit 20 to maintain a temperature required for reforming, the fuel cell is reformed (i.e., steam reformed, SR) in the first reforming portion 12 by heat transmitted from the heating unit 20. That is, the first reforming portion 12 has a first space configured to perform a steam reform reaction. Reformate generated at that time is supplied to the generator with carbon monoxide reduced through a water gas shift (WGS) reaction in the catalyst layer of the flow path portion 11 and the second reforming portion 10. Here, the second reforming portion 10 has a second space configured to perform the WGS reaction. Reformate (~71% H2, 25% CO2, ~1% CH4) of 7LPM generated in the reformer produces electricity through the generator such as the stack and thereafter, the generation amount of remaining reformate (~47% H2, ~45% CO2, ~1% CH4, N2 balance) is approximately 4.3 LPM (liters per minute). That is, pursuant to an embodiment of the present invention, hydrogen of approximately 3 SLPM (standard liters per minute) of hydrogen having a generation amount of approximately 5 SLPM is used to generate electricity and hydrogen of 2 SLPM remains as remaining gas, that is, the AOG. The AOG generated as described above is supplied into the heating unit 20 through the second combustor 22 and thereafter, is primarily oxidized and converted into heat.

Figure 3:
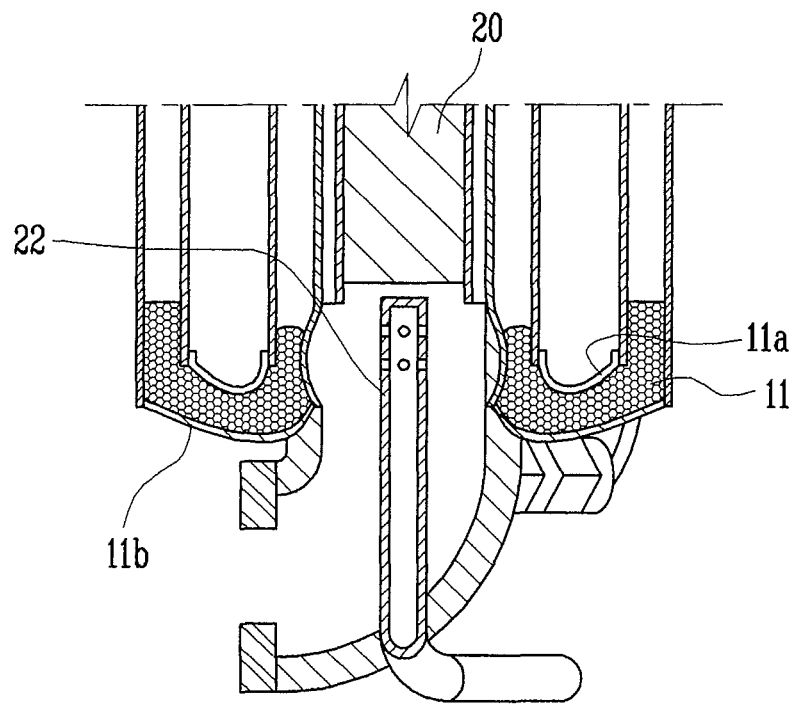
FIG. 3 is a longitudinal cross-sectional view showing a crack generated in a reformer having a dual oxidization structure.

A test operation evaluating the hot spots and influence on peripheral devices by the AOG was performed. As a result, as shown in FIG. 3, the bottom of the inner peripheral surface of the first reforming portion 12 is transformed (distorted) by thermal expansion at high-temperature atmosphere, and consequently, the top plate 11a and the bottom plate 11b of the flow path portion 11 constrains the transformation by the thermal expansion. Thereafter, the top plate 11a and the bottom plate 11b are simultaneously transformed (distorted) by high temperature and/or welds (or weld points) to the first reforming portion 12 and are thus, damaged during the transformation. The transformation strength is influenced by the thermal strength (the amount and concentration of hydrogen in the AOG), the thermal shock condition by a reformer operation (on-off) logic, as well as the characteristics of a material such as SUS steel configuring the reformer.

Figure 4:
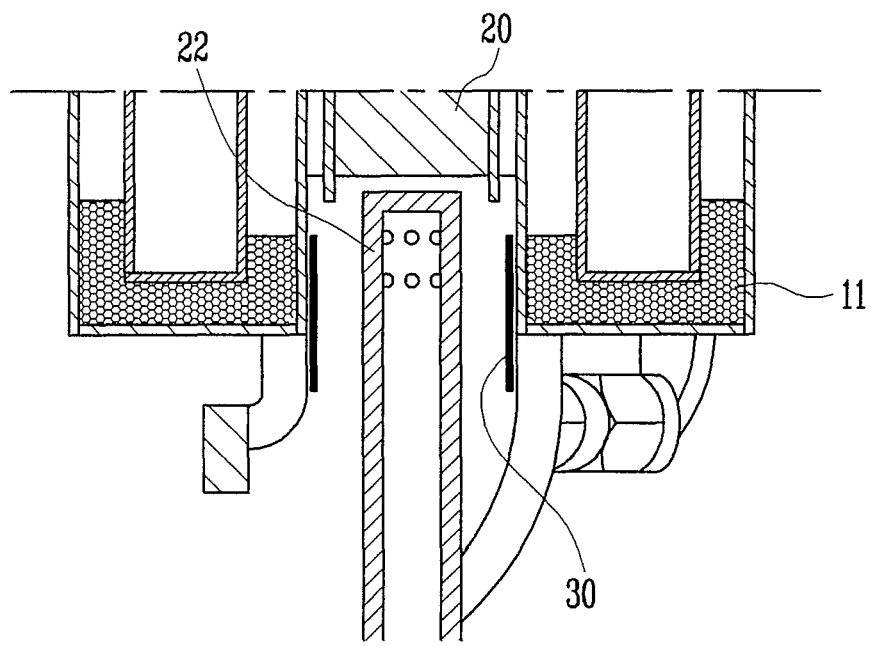
FIG. 4 is a longitudinal cross-sectional view schematically showing a configuration of a reformer including a shield according to an embodiment of the present invention.
Figure 5:
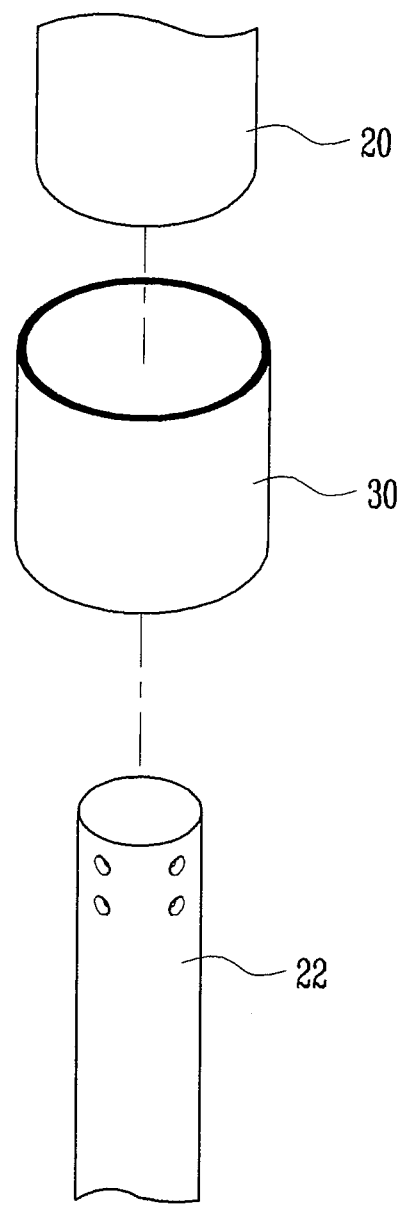
FIG. 5 is an exploded perspective view for describing a shield according to an embodiment of the present invention.

In one embodiment of the present invention, the problem as described above is solved through structural reinforcement of the thermal transformation. That is, as shown in FIGS. 4 and 5, a shield 30 is provided. In one embodiment, the shield (or the heat resistant shield) 30 overlaps at least a portion of the nozzle of the second combustor 22, as shown in FIG. 4.

In particular, FIG. 4 is a longitudinal cross-sectional view schematically showing an embodiment of the reformer including the shield 30. In the shield 30, a heat resistant member comparatively resists heat, and may be composed of SUS 310 that is formed to have a hollow cylindrical shape (e.g., a hollow cylinder) and is fixed to a peripheral surface of the innermost wall of the flow path portion 11 facing the second combustor 22. Here, the shield 30 and the innermost wall of the flow path portion 11 are preferably fixed by spot welding with spot welds expanded with a set, or predetermined degree of freedom even in thermal expansion. That is, the heat resistant shield 30 contacts and/or is fixed to a peripheral surface of an innermost wall of the flow path portion 11 facing the second combustor 22 by one or more spot welds.

For example, in some embodiments, spot welds are placed (welded) on several positions of the peripheral surface of the heat resistance shield 30. Here, in one embodiment, when the shield 30 is heated, the shield 30 can be expanded up from the weld positions so as decrease thermal stress. Furthermore, in one embodiment, the welds should be separated from each other in a uniform manner and should each have a uniform size to uniformly distribute the thermal expansion effect.

Figure 8:
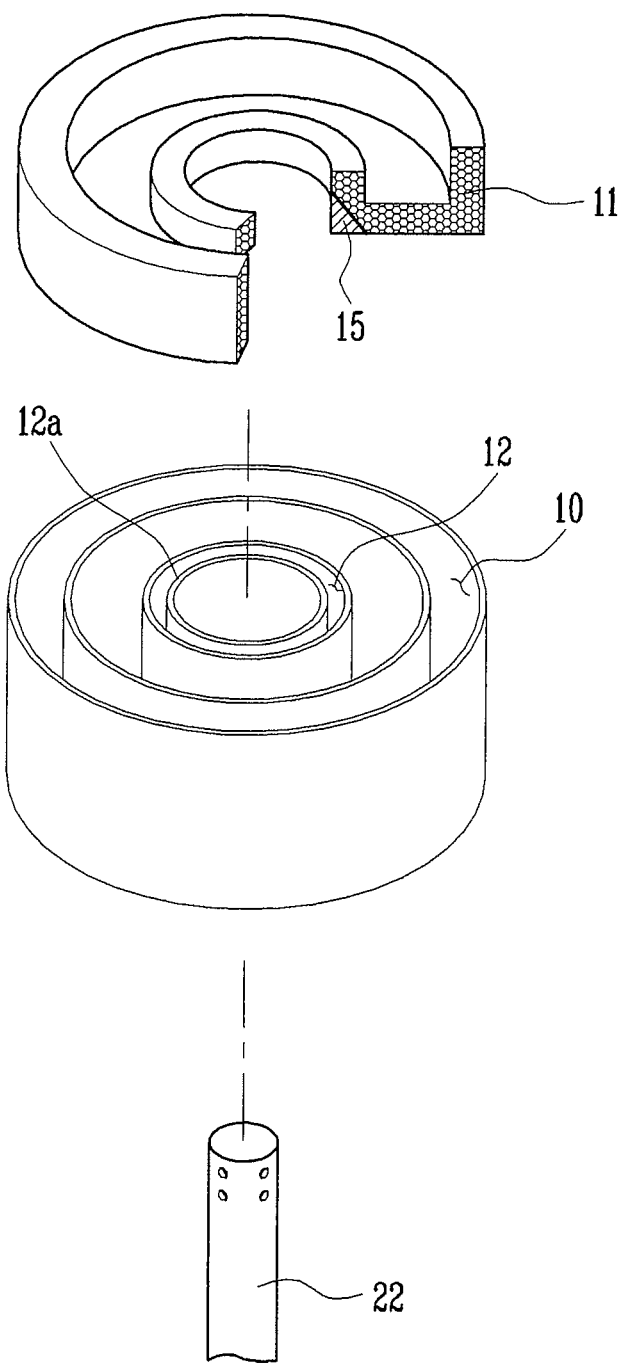
FIG. 8 is a cut perspective view for showing a blade according to an embodiment of the present invention.

A blade 15 may be further provided as shown in FIG. 8 in addition or as an alternative to the shield 30. FIG. 8 is a perspective decomposed and sectioned view of the catalyst layer in the flow path portion 11 for showing an attachment position of the blade. Here, the blade 15 is a member having a plane shape with a structure that positively prevents the innermost wall of the flow path portion 11 from being transformed (distorted) by the thermal expansion by fixing the bottom of the outer peripheral surface of the innermost wall of the flow path portion 11 and the bottom plate 11b of the flow path portion 11. The blade 15 is provided in multiples to block or prevent the innermost wall of the flow path portion 11 from being transformed (distorted) by thermal expansion and/or to more efficiently transmit the heat to the catalyst and/or to improve the distribution of fluid flowing in the flow path portion 11. In one embodiment, the blade 15 is provided on an extension line in a substantial direction of the thermal expansion, that is, a diameter direction on the basis of the central axis of the heating unit 20 to efficiently support the innermost wall of the flow path portion 11.

In more detail, the flow path portion 11 is formed to include the blade 50 configured to protect the flow path portion 11 from being distorted by thermal expansion and/or to improve the distribution of fluid flowing in the flow path portion 11. Here, in one embodiment, the blade 50 is formed on an extension line extending along a diameter direction with respect to the central axis of the heating unit 20 in the flow path portion 11 and fixed to a bottom of an innermost wall of the flow path portion 11 and the bottom plate 11b of the flow path portion. That is, the blade 50 is on the extension line extending along the diameter direction with respect to the central axis of the heating unit 20 in the flow path portion 11 and fixed to a surface of the innermost wall of the flow path portion 11 facing away from the second combustor 22 and a bottom plate 11b of the flow path portion 11.

In view of the foregoing and according to an embodiment of the present invention, a durable reformer for a fuel cell is provided with a structure capable of protecting a reforming unit from being distorted by thermal expansion. The reformer includes a heating unit, a first combustor configured to receive and oxidize a heating unit fuel at a first end of the heating unit, and a second combustor configured to receive and oxidize an anode off gas at a second end of the heating unit, a reforming unit having a first reforming portion surrounding the heating unit, a second reforming portion surrounding the first reforming portion, and a flow path portion outside the second forming portion and connecting the first reforming portion and the second reforming portion to provide fluid communication therebetween, and a heat resistant shield between the flow path portion and the second combustor. Here, the heat resistant shield protects the reforming unit (specifically the flow path portion) from being distorted by thermal expansion caused by the heating unit (e.g., by the heat generated at the second combustor). In addition, the flow path portion may be formed with a blade configured to further protect the connector from being distorted by thermal expansion.

While the present invention has been described in connection with certain exemplary embodiments, it is to be understood that the invention is not limited to the disclosed embodiments, but, the present invention may be implemented by various reformers with high durability within the scope without departing from the spirit of the appended claims and equivalents thereof.

What is claimed is:

1. A reformer comprising:
a heating unit comprising a heating unit chamber extending in a first direction, and a combustor configured to receive and oxidize an anode off gas (AOG);
a reforming unit comprising a first reforming portion surrounding the heating unit chamber, a second reforming portion surrounding the first reforming portion, and a flow path portion connecting the first reforming portion and the second reforming portion at an end region of the first reforming portion and the second reforming portion; and
a heat resistant shield attached to a surface of the flow path portion facing the combustor and located adjacent to the combustor, wherein the heat resistant shield extends in the first direction, and the heat resistant shield is fixed to the surface of the flow path portion facing the combustor at at least one point such that the heat resistant shield can expand in the first direction as a result of heat from the combustor.

2. The reformer of claim 1, wherein the combustor comprises a nozzle configured to expel the anode off gas into the heating unit, and wherein the heat resistant shield overlaps at least a portion of the nozzle.

3. The reformer of claim 1, wherein the heat resistant shield contacts a surface of an innermost wall of the flow path portion facing the combustor.

4. The reformer of claim 1, wherein the heat resistant shield is fixed to a peripheral surface of an innermost wall of the flow path portion facing the combustor by a spot weld.

5. The reformer of claim 1, wherein the flowing path further comprises a blade configured to protect the flow path portion from being distorted by thermal expansion.

6. The reformer of claim 5, wherein the blade is on an extension line extending along a diameter direction with respect to a central axis of the heating unit in the flow path portion and fixed to a surface of an innermost wall of the flow path portion facing away from the combustor and a bottom plate of the flow path portion.

7. The reformer of claim 1, wherein the combustor comprises a nozzle configured to expel the anode off gas in a direction perpendicular to the central axis of the heating unit.

8. The reformer of claim 1, wherein the first reforming portion has a first space configured to perform a steam reform reaction.

9. The reformer of claim 1, wherein the second reforming portion has a second space configured to perform a water gas shift (WGS) reaction.

10. The reformer of claim 1, wherein the flow path portion is outside of at least one of the second reforming portion or the first reforming portion.

11. The reformer of claim 1, wherein the flow path portion is outside of both the second reforming portion and the first reforming portion.

12. A reformer comprising:
a heating unit comprising a heating unit chamber extending in a first direction;
a first combustor configured to receive and oxidize a heating unit fuel at a first end of the heating unit;
a second combustor configured to receive and oxidize an anode off gas (AOG) at a second end of the heating unit;
a reforming unit comprising a first reforming portion surrounding the heating unit chamber, a second reforming portion surrounding the first reforming portion, and a flow path portion connecting the first reforming portion and the second reforming portion at an end region of the first reforming portion and the second reforming portion; and
a heat resistant shield attached to a surface of the flow path portion facing the second combustor and located adjacent to the second combustor, wherein the heat resistant shield extends in the first direction, and the heat resistant shield is fixed to the surface of the flow path portion facing the second combustor at at least one point such that the heat resistant shield can expand in the first direction as a result of heat from the combustor.

13. The reformer of claim 12, wherein the second combustor comprises a nozzle configured to expel the anode off gas in a direction perpendicular to the central axis of the heating unit.

14. The reformer of claim 12, wherein the first reforming portion has a first space configured to perform a steam reform reaction.

15. The reformer of claim 12, wherein the second reforming portion has a second space configured to perform a water gas shift (WGS) reaction.

16. The reformer of claim 12, wherein the flow path portion is outside of at least one of the second reforming portion or the first reforming portion.

17. The reformer of claim 12, wherein the flow path portion is outside of both the second reforming portion and the first reforming portion.

18. The reformer of claim 12, wherein the flow path portion further comprises a blade configured to protect the flow path portion from being distorted by thermal expansion.

19. The reformer of claim 18, wherein the blade is on an extension line extending along a diameter direction with respect to a central axis of the heating unit in the flow path portion and fixed to a surface of an innermost wall of the flow path portion facing away from the second combustor and a bottom plate of the flow path portion.

* * * * *

UNITED STATES PATENT AND TRADEMARK OFFICE
CERTIFICATE OF CORRECTION

| | |
|---|---|
| PATENT NO. | : 8,591,609 B2 |
| APPLICATION NO. | : 12/761598 |
| DATED | : November 26, 2013 |
| INVENTOR(S) | : In-Hyuk Son et al. |

It is certified that error appears in the above-identified patent and that said Letters Patent is hereby corrected as shown below:

In the Claims

Column 8, line 4, Claim 5        Delete "flowing path"

Insert -- flow path portion --

Signed and Sealed this
Sixteenth Day of June, 2015

Michelle K. Lee
*Director of the United States Patent and Trademark Office*